US011026543B2

(12) United States Patent
Witzel et al.

(10) Patent No.: US 11,026,543 B2
(45) Date of Patent: Jun. 8, 2021

(54) PELLET-FIRED COOKING APPARATUS

(71) Applicant: Onward Multi-Corp Inc., Waterloo (CA)

(72) Inventors: Terry Witzel, Waterloo (CA); Colin Kirvan, Waterloo (CA)

(73) Assignee: ONWARD MULTI-CORP. INC., Waterloo (CA)

( * ) Notice: Subject to any disclaimer, the term of this patent is extended or adjusted under 35 U.S.C. 154(b) by 99 days.

(21) Appl. No.: 16/295,712

(22) Filed: Mar. 7, 2019

(65) Prior Publication Data

US 2020/0281402 A1    Sep. 10, 2020

Related U.S. Application Data

(60) Provisional application No. 62/639,777, filed on Mar. 7, 2018.

(51) Int. Cl.
| | |
|---|---|
| *A47J 37/07* | (2006.01) |
| *F23K 3/22* | (2006.01) |
| *F23L 5/02* | (2006.01) |
| *F23J 1/00* | (2006.01) |
| *F23J 1/06* | (2006.01) |

(52) U.S. Cl.
CPC ............. *A47J 37/0704* (2013.01); *F23K 3/22* (2013.01); *F23L 5/02* (2013.01); *F23J 1/00* (2013.01); *F23J 1/06* (2013.01); *F23J 2700/00* (2013.01); *F23J 2700/001* (2013.01); *F23J 2700/003* (2013.01); *F23K 2203/202* (2013.01); *F23K 2900/00* (2013.01)

(58) Field of Classification Search
CPC ... A47J 37/0704; A47J 37/07; F23K 2900/00; F23K 3/22; F23K 2302/202; F23L 5/02; F23J 1/00; F23J 1/06; F23J 2700/00; F23J 2700/001; F23J 2700/003
See application file for complete search history.

(56) References Cited

U.S. PATENT DOCUMENTS 2,408,921 A * 10/1946 Esson ................... F24B 13/008
                                                     126/245
4,334,315 A *  6/1982 Ono ....................... H04B 1/385
                                                     128/201.19

(Continued)

*Primary Examiner* — David J Laux
*Assistant Examiner* — Nikhil P Mashruwala
(74) *Attorney, Agent, or Firm* — Bereskin & Parr LLP/S.E.N.C.R.L., s.r.l.

(57) ABSTRACT

A cooking apparatus, having a body defining an interior cooking chamber for cooking food, a pellet supply portion coupled to the body and including a hopper for storing fuel, a combustion chamber for burning the fuel and heating the cooking chamber, a feeding mechanism for supplying fuel from the hopper to the combustion chamber, and a removable collection receptacle located below the combustion chamber. The apparatus also includes an ash-shaker located between the collection receptacle and the combustion chamber, the ash-shaker including an external actuator that controls one or more moving elements located in the combustion chamber, wherein movement of the moving elements encourages unburned debris in the combustion chamber to fall into the receptacle, after which the collection receptacle can be removed and the unburned debris discarded.

15 Claims, 18 Drawing Sheets

(56) References Cited

U.S. PATENT DOCUMENTS

| | | | | |
|---|---|---|---|---|
| 4,383,517 A * | 5/1983 | Gillis | | F24B 7/025 126/163 R |
| 4,491,077 A * | 1/1985 | Petty | | F23B 1/18 110/165 R |
| 4,515,144 A * | 5/1985 | Cumpston | | F24B 13/02 126/173 |
| 4,610,208 A * | 9/1986 | Lersten | | F23B 1/08 110/244 |
| 4,823,684 A * | 4/1989 | Traeger | | A47J 37/0704 126/10 |
| 4,989,521 A * | 2/1991 | Traeger | | F23B 1/38 110/102 |
| 5,086,714 A * | 2/1992 | Hladun | | F23H 9/04 110/165 A |
| 5,265,587 A * | 11/1993 | Carlson | | F24B 13/02 110/281 |
| 5,285,738 A * | 2/1994 | Cullen | | F23B 1/00 110/110 |
| 5,702,244 A * | 12/1997 | Goodson | | F01N 3/26 431/2 |
| 6,000,389 A * | 12/1999 | Alpert | | A47J 37/0713 126/25 R |
| 6,135,035 A * | 10/2000 | Masek | | C05F 3/00 110/228 |
| 6,223,737 B1 * | 5/2001 | Buckner | | F23B 1/38 110/108 |
| 7,739,966 B2 * | 6/2010 | Ingvarsson | | F23B 60/02 110/190 |
| 8,464,704 B2 * | 6/2013 | Brown | | F24B 1/006 126/77 |
| 9,140,448 B2 * | 9/2015 | Freeman | | F23B 50/12 |
| 10,508,814 B2 * | 12/2019 | Wu | | F24B 1/024 |
| 10,718,514 B1 * | 7/2020 | Yu | | F23G 5/24 |
| 2007/0137634 A1 * | 6/2007 | Traeger | | A47J 37/0704 126/29 |
| 2013/0298894 A1 * | 11/2013 | Kleinsasser | | A47J 37/0704 126/25 R |
| 2013/0327259 A1 * | 12/2013 | Freeman | | F24B 13/04 110/286 |
| 2017/0164783 A1 * | 6/2017 | Sauerwein | | A47J 37/0786 |
| 2019/0099041 A1 * | 4/2019 | Figueroa | | A47J 37/0704 |
| 2019/0374065 A1 * | 12/2019 | Hancock | | A47J 37/0713 |

* cited by examiner

PELLET-FIRED COOKING APPARATUS

RELATED APPLICATIONS

This application claims the benefit of U.S. Provisional Patent Application Ser. No. 62/639,777 filed Mar. 7, 2018 and entitled Pellet-Fired Cooking Apparatus, the entire contents of which are hereby incorporated by reference herein for all purposes.

TECHNICAL FIELD

The embodiments disclosed herein relate to cooking apparatus such as barbecues and smokers, and, in particular to pellet-fired cooking apparatus that use pellet based fuel, such as wood pellets.

INTRODUCTION

U.S. Pat. No. 4,823,684 to Traeger is a Pellet-Fired Barbecue, and describes a pellet-fired barbecue including an elevated barbecue pan fired by a pellet-burning pot mounted below the bottom of the barbecue. A heat baffle plate is disposed within the pan above the top of the pot, and forced-air mechanism produces movement of hearted air within the barbecue.

U.S. Pat. No. 4,989,521 to Traeger is a Gravity Fed Pellet Burner, and describes a gravity operated burner for particulate fuel. Fuel held in a hopper drops downwardly through a fuel tube to fall on an inclined chute. The chute feeds a shelf where burning takes place in a high heat zone. Material on the shelf stops unhindered flow of fuel down the chute.

U.S. Pat. No. 5,251,607 to Traeger is a Pellet-Fired Cooking Grill, and describes a pellet-fired cooking grill which includes a housing having a grill chamber defined within it. Tubular structure extends downwardly from the base of the chamber and defined within this structure is a burning zone. A hopper holding pellet fuel disposed above and adjacent the burning zone supplied pellets through a gravity operated chute to the burning zone.

BRIEF DESCRIPTION OF THE DRAWINGS

The drawings included herewith are for illustrating various examples of articles, methods, and apparatuses of the present specification. In the drawings.

DETAILED DESCRIPTION

Referring to FIGS. 1 to 8 generally, illustrated therein is a cooking apparatus 10.

The cooking apparatus 10 includes a body 12 defining an interior cooking chamber C for cooking food. As shown, the body 12 may be supported by a base 16, and the body 12 includes a lid 20 that encloses the cooking chamber C.

Figure 7:
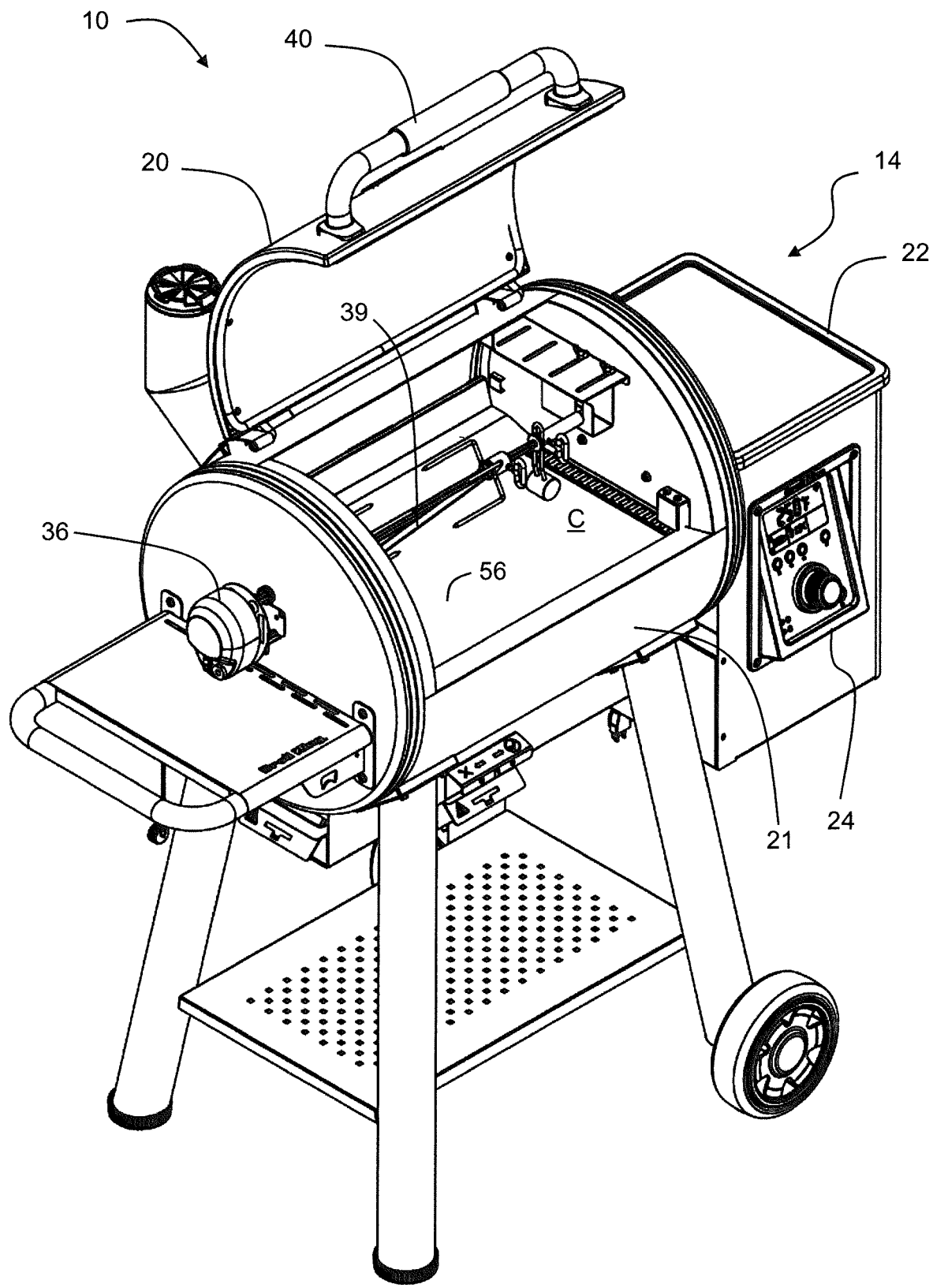
FIG. 7 is another perspective view of the pellet fired cooking apparatus of FIG. 1 shown with the lid open.

The lid 20 may be adapted to removably cover the cooking chamber C. For example, as shown in FIG. 7, the lid 20 may be hingedly coupled to the chamber bottom 21, and may have a handle 40 for pivoting the lid 20 between open and closed positions.

The body 12 also includes a chimney 26 for venting exhaust during use. The chimney 26 may include an adjustable valve 27 (i.e., a rotatable plate) to control the amount of exhaust exiting the cooking chamber C (which may be particularly useful during a smoking operation, for example).

In some embodiments, coupled to the body 12 may be a shelf 34. The shelf 34 as shown is located on one side of the body 12, and can be used for supporting items (i.e., food, sauces, etc.) prior to or during the cooking operation.

Figure 22:
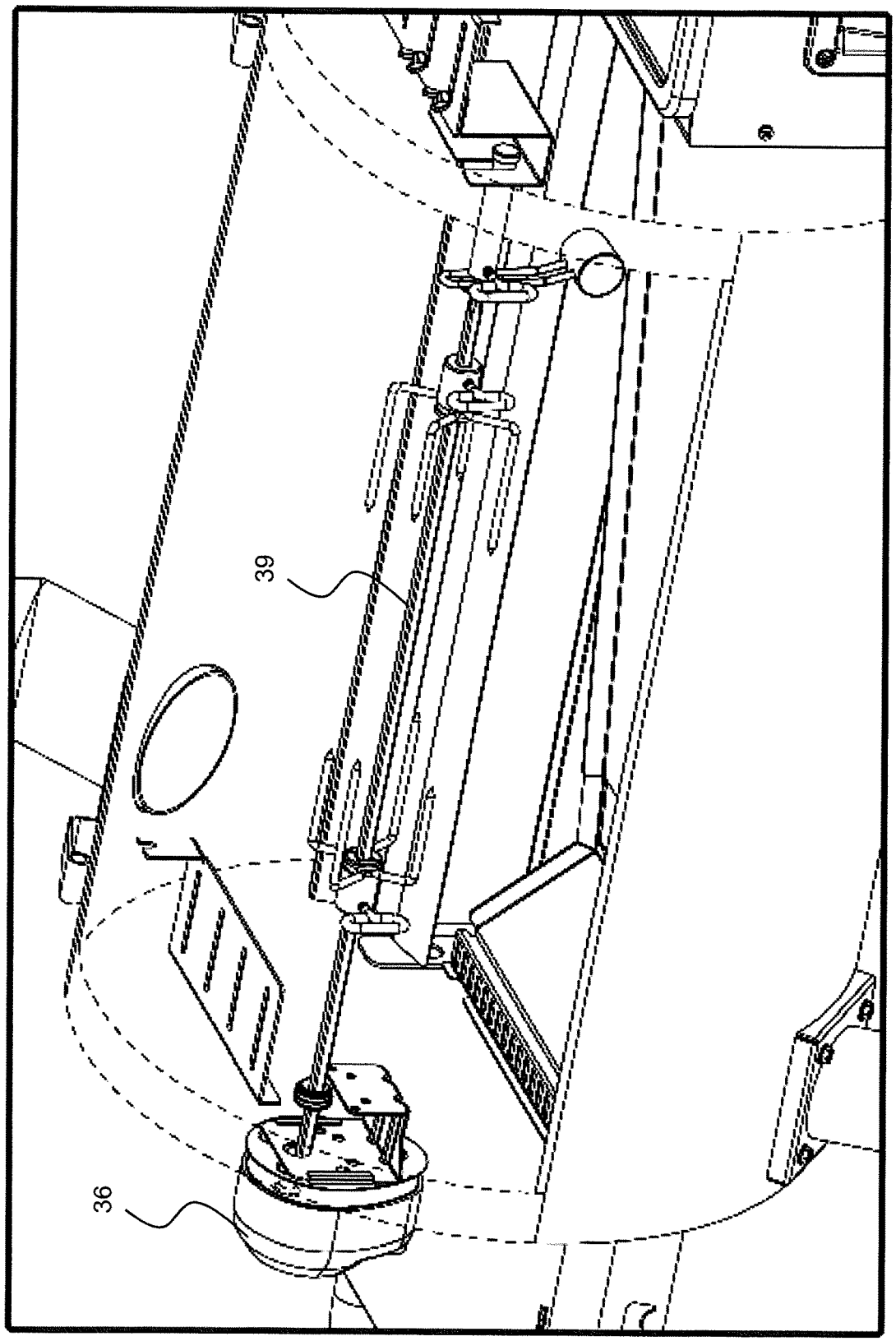
FIG. 22 is a perspective view of a rotisserie apparatus of the cooking apparatus of FIG. 1 according to one embodiment.

In some embodiments, the cooking apparatus 12 may include a rotisserie 39 (as shown in FIG. 22 for example) for cooking food. The rotisserie 39 may be driven by a motor 36 and may be supported at one or more ends of the body 12.

Figure 3:
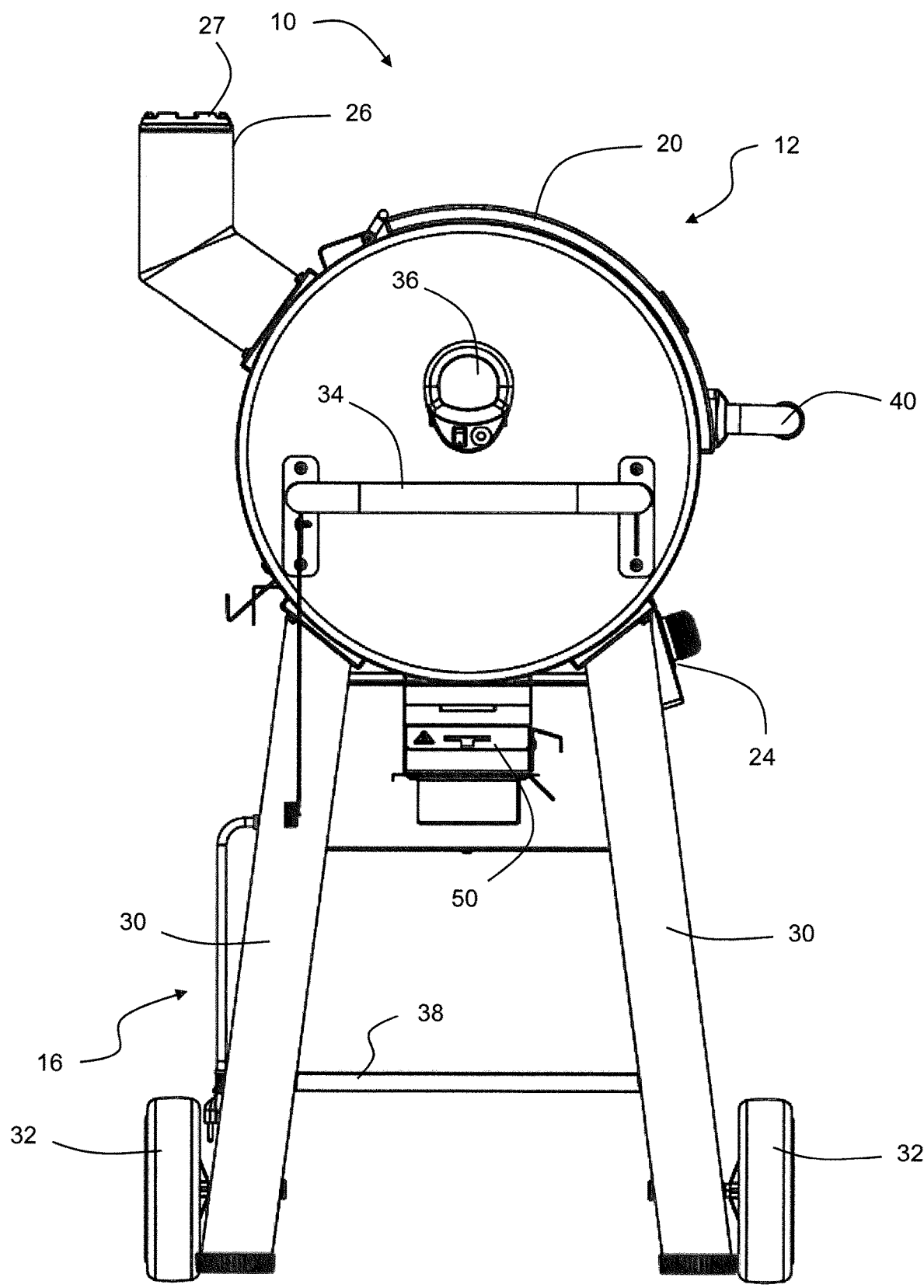
FIG. 3 is a left-side elevation view of the pellet fired cooking apparatus of FIG. 1.
Figure 4:
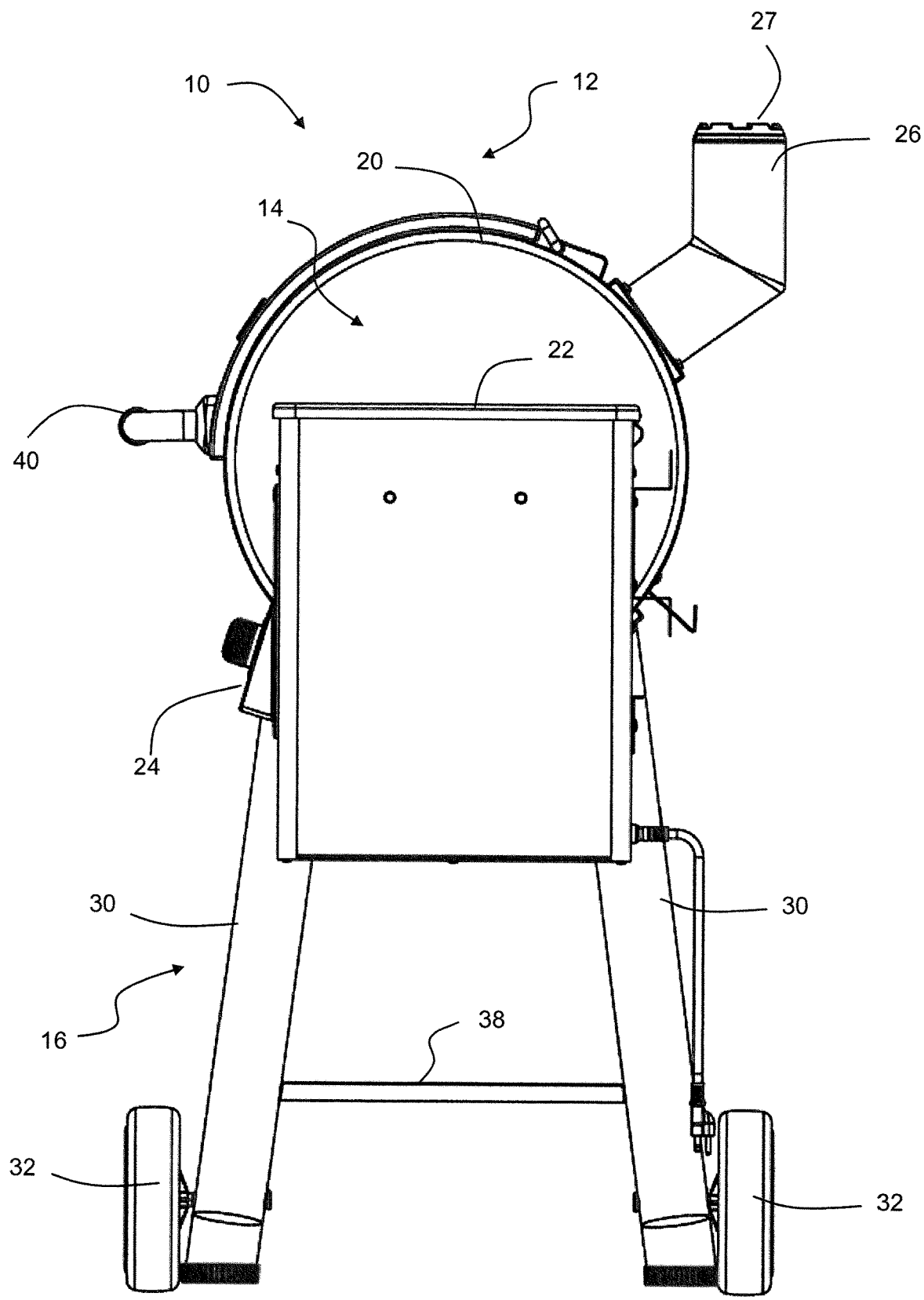
FIG. 4 is a right-side elevation view of the pellet fired cooking apparatus of FIG. 1.
Figure 5:
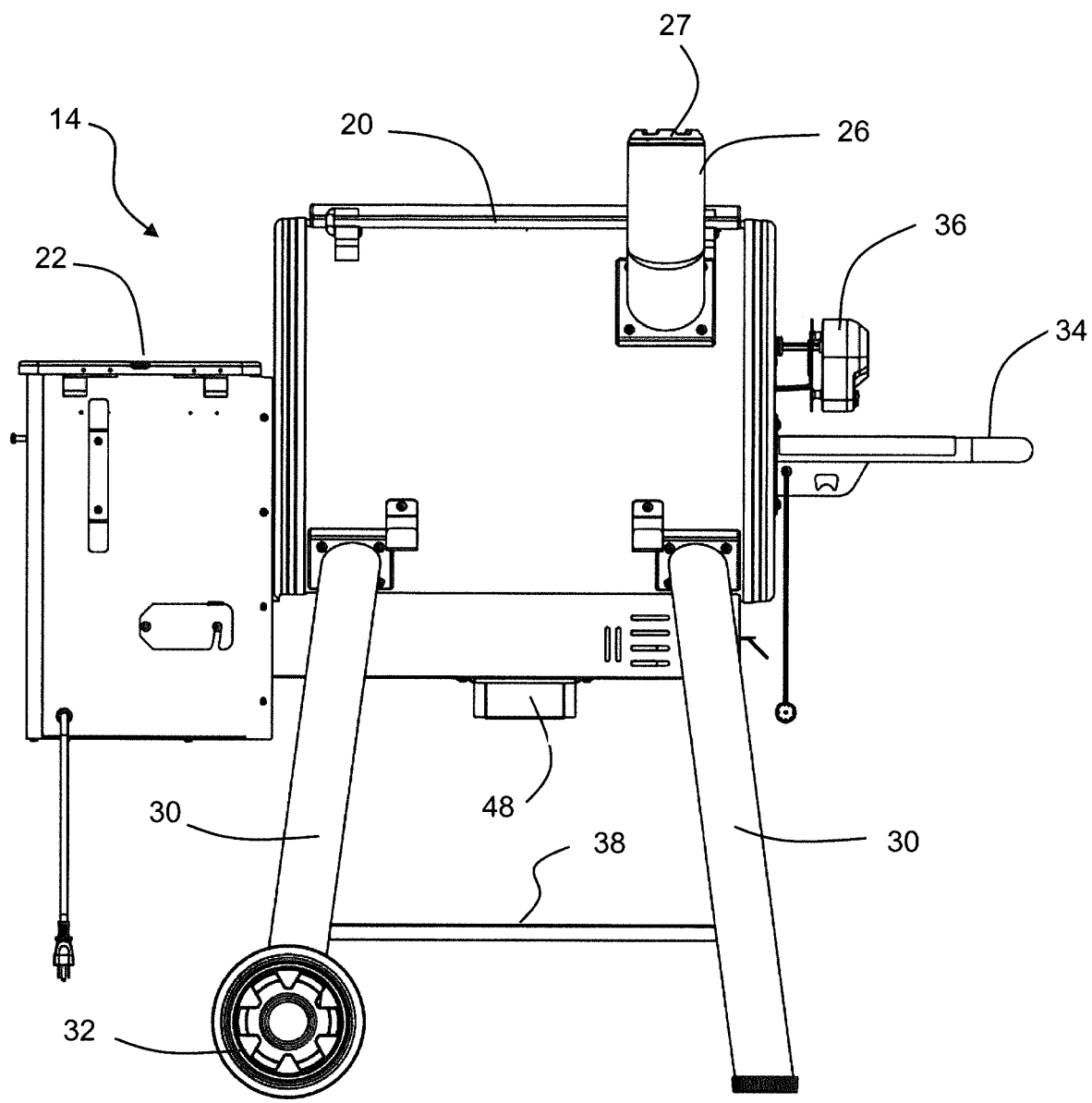
FIG. 5 is a rear elevation view of the pellet fired cooking apparatus of FIG. 1.
Figure 6:
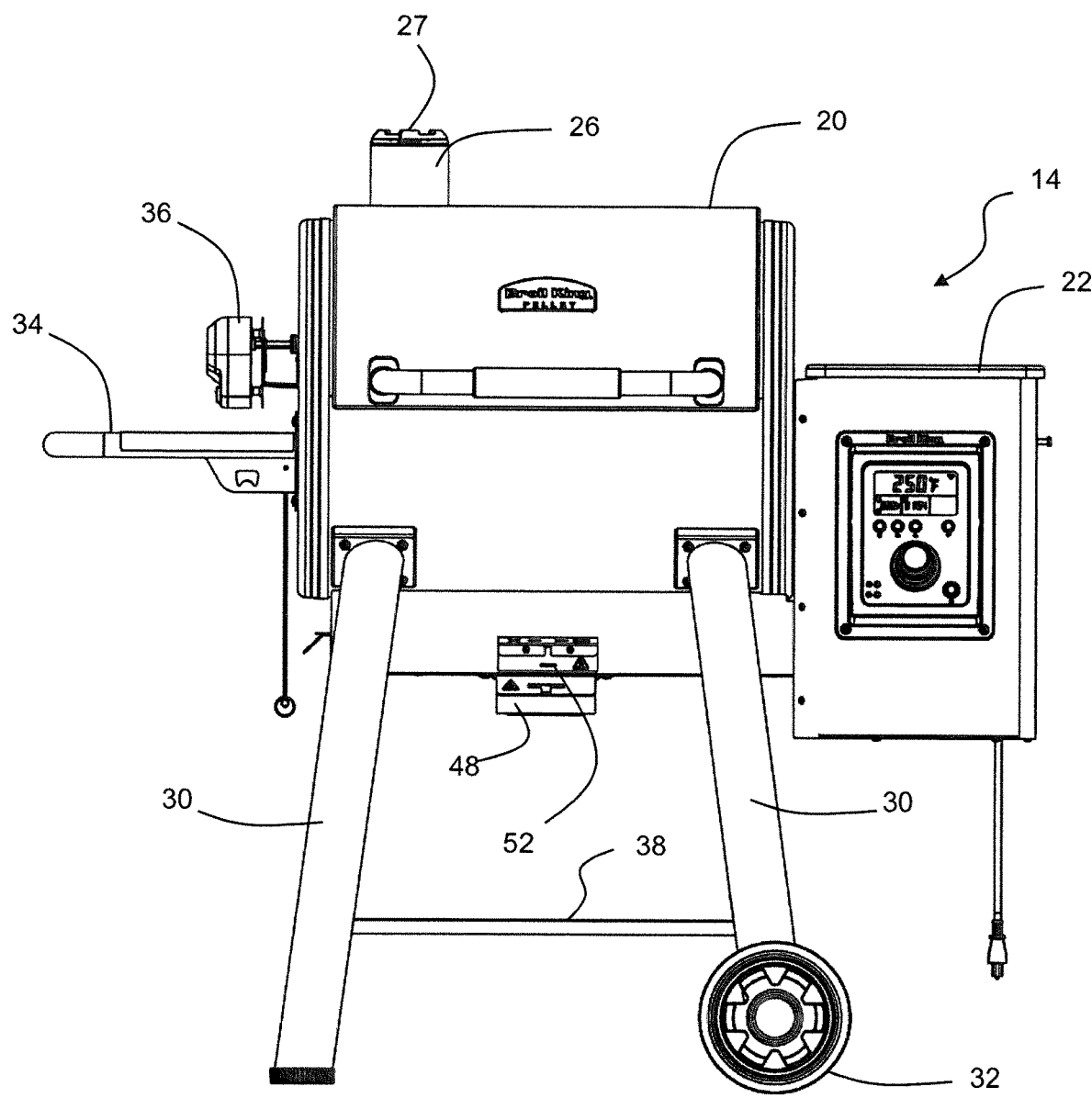
FIG. 6 is a front elevation view of the pellet fired cooking apparatus of FIG. 1.

Turning now to FIG. 3 for example, in some embodiments the body 12 may include a grease trap 50 for catching grease and other debris that is generated during use of the cooking apparatus 10.

Figure 8:
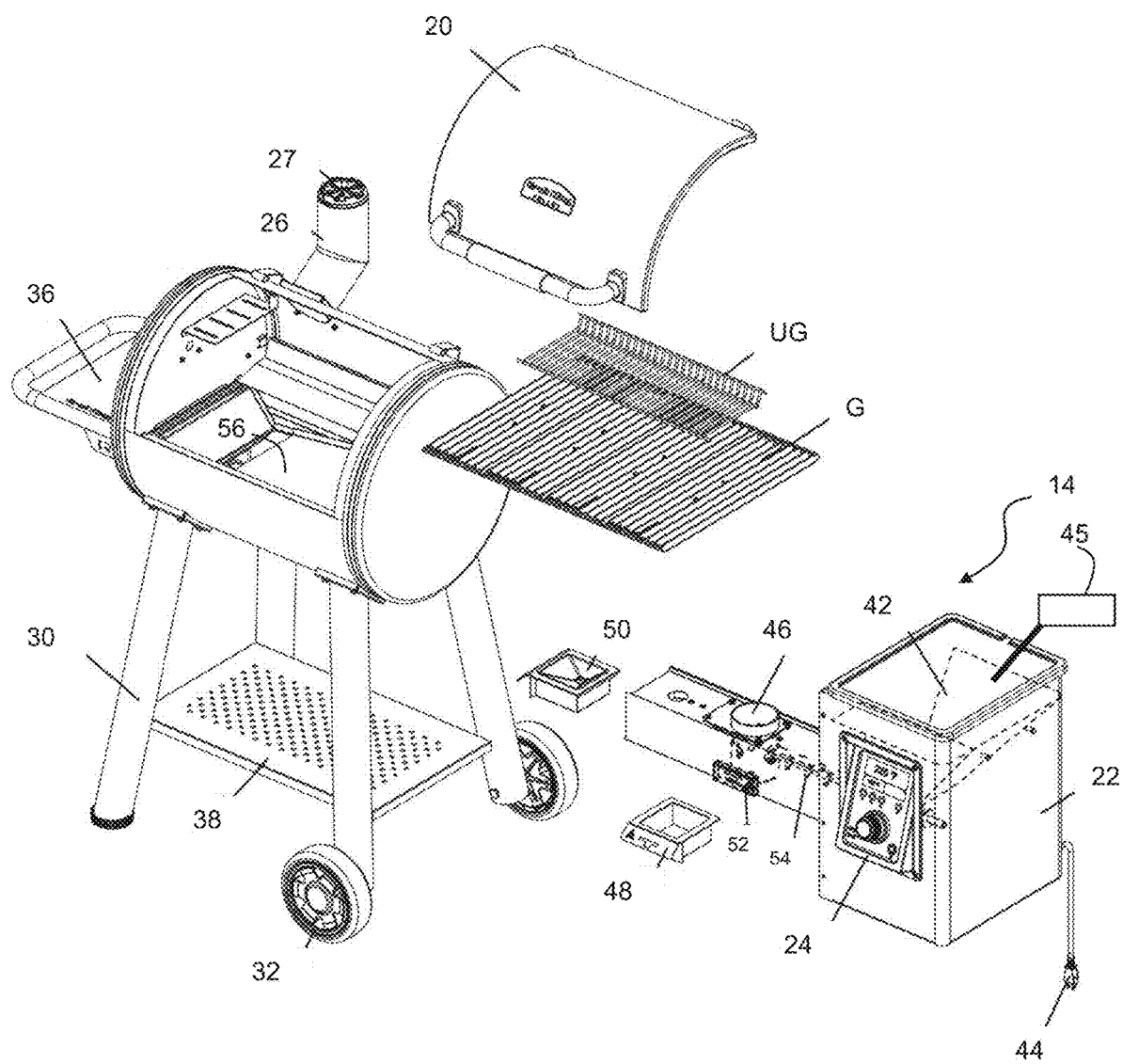
FIG. 8 is an exploded perspective view of the pellet fired cooking apparatus of FIG. 1.
Figure 9:
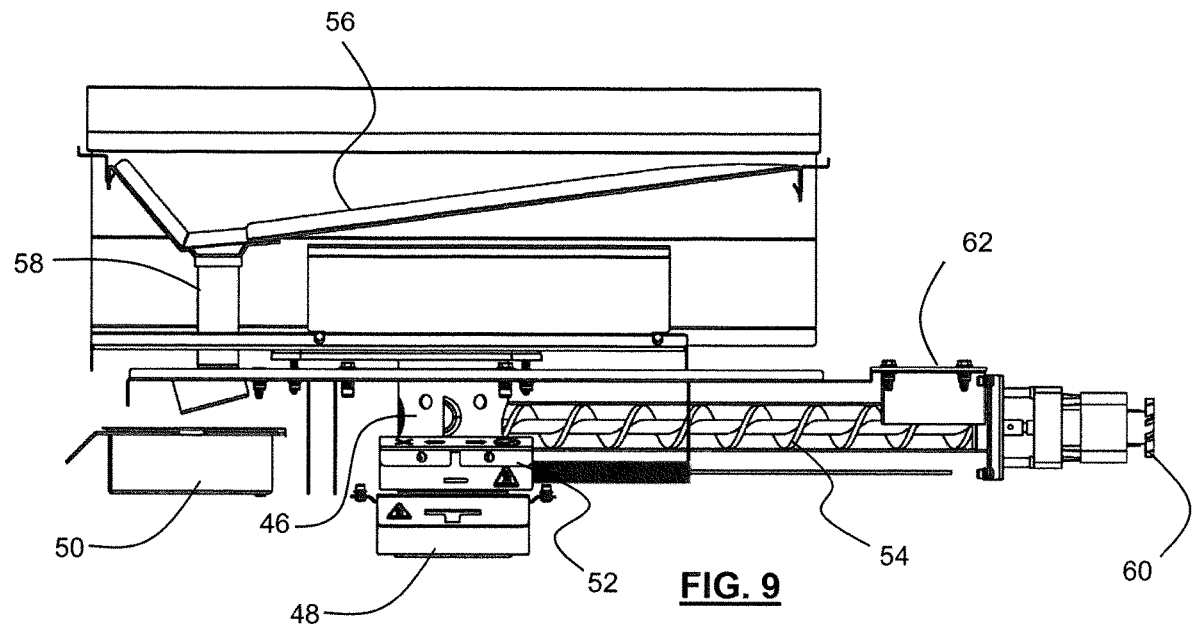
FIG. 9 is an elevation view of the grease tray and pellet feeding auger of the cooking apparatus of FIG. 1 according to one embodiment.
Figure 10:
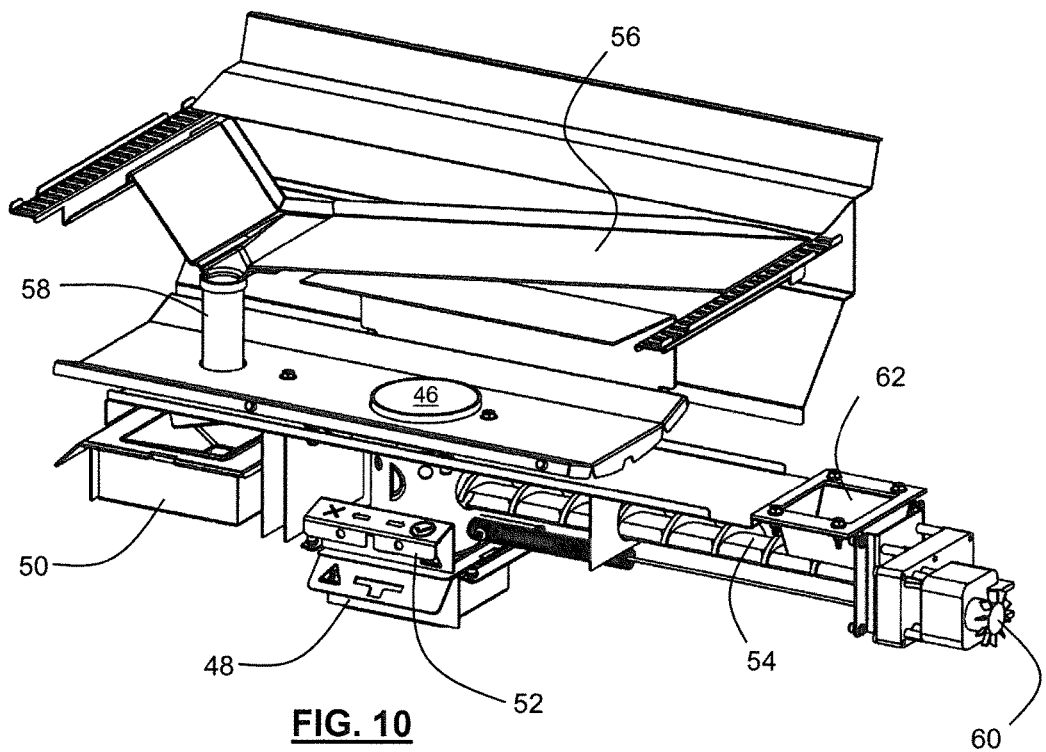
FIG. 10 is perspective view of the grease tray and pellet feeding auger of FIG. 9.
Figure 11:
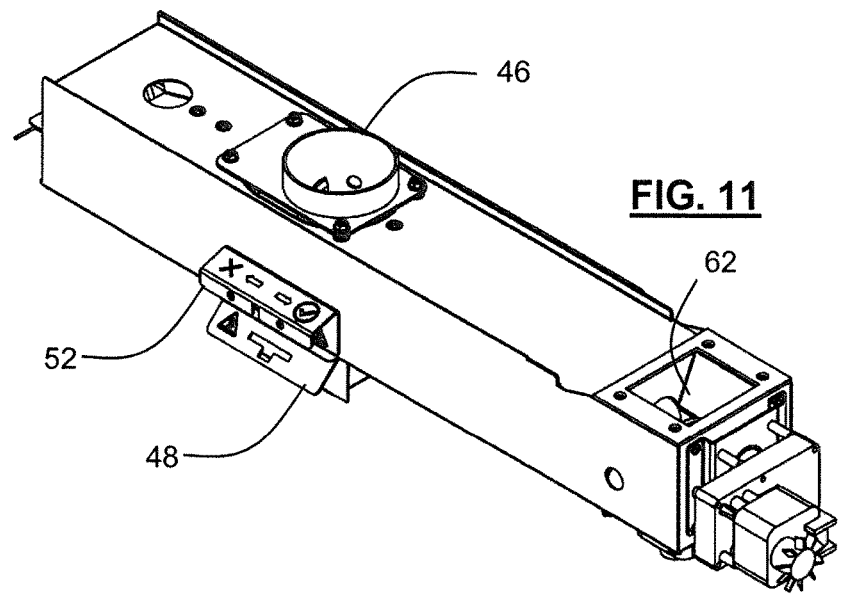
FIG. 11 is a perspective view of the enclosed pellet feeding auger and fire pot assembly of the cooking apparatus of FIG. 1 according to one embodiment.
Figure 12:
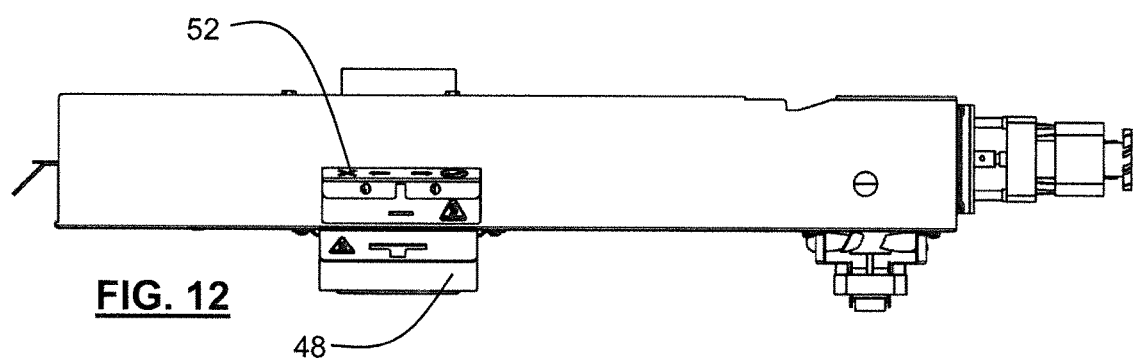
FIG. 12 is a front elevation view of the enclosed pellet feeding auger and fire pot assembly of FIG. 11.
Figure 13:
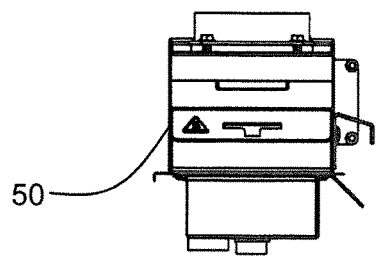
FIG. 13 is a left-side elevation view of the enclosed pellet feeding auger and fire pot assembly of FIG. 11.
Figure 14:
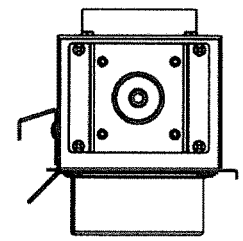
FIG. 14 is a right-side elevation view of the enclosed pellet feeding auger and fire pot assembly of FIG. 11.
Figure 15:
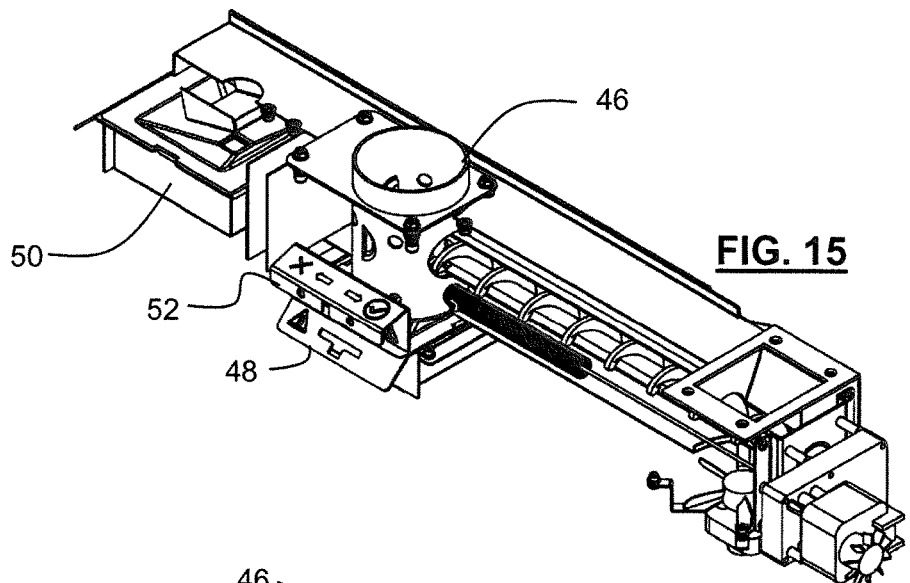
FIG. 15 is a perspective view of the enclosed pellet feeding auger and fire pot assembly of FIG. 11 with the front cover removed.
Figure 16:
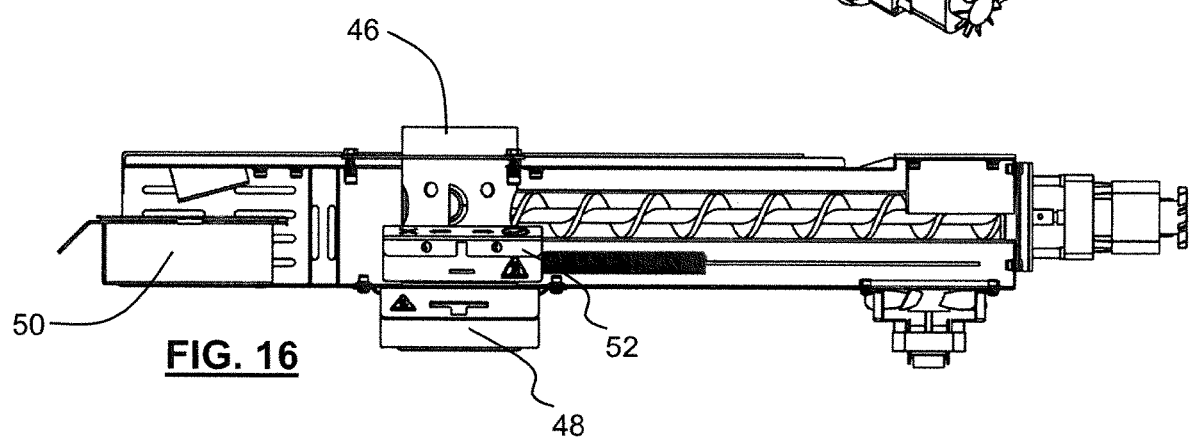
FIG. 16 is a front elevation view of the enclosed pellet feeding auger and fire pot assembly of FIG. 11 with the front cover removed.
Figure 17:
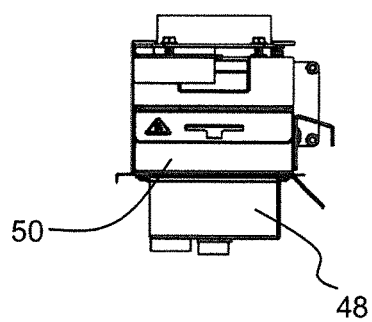
FIG. 17 is a left-side elevation view of the enclosed pellet feeding auger and fire pot assembly of FIG. 11 with the front cover removed.
Figure 18:
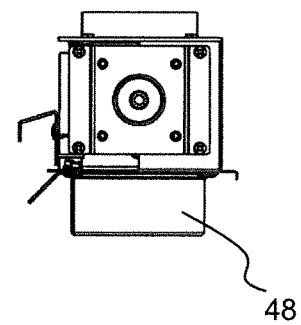
FIG. 18 is a right-side elevation view of the enclosed pellet feeding auger and fire pot assembly of FIG. 11 with the front cover removed.
Figure 19:
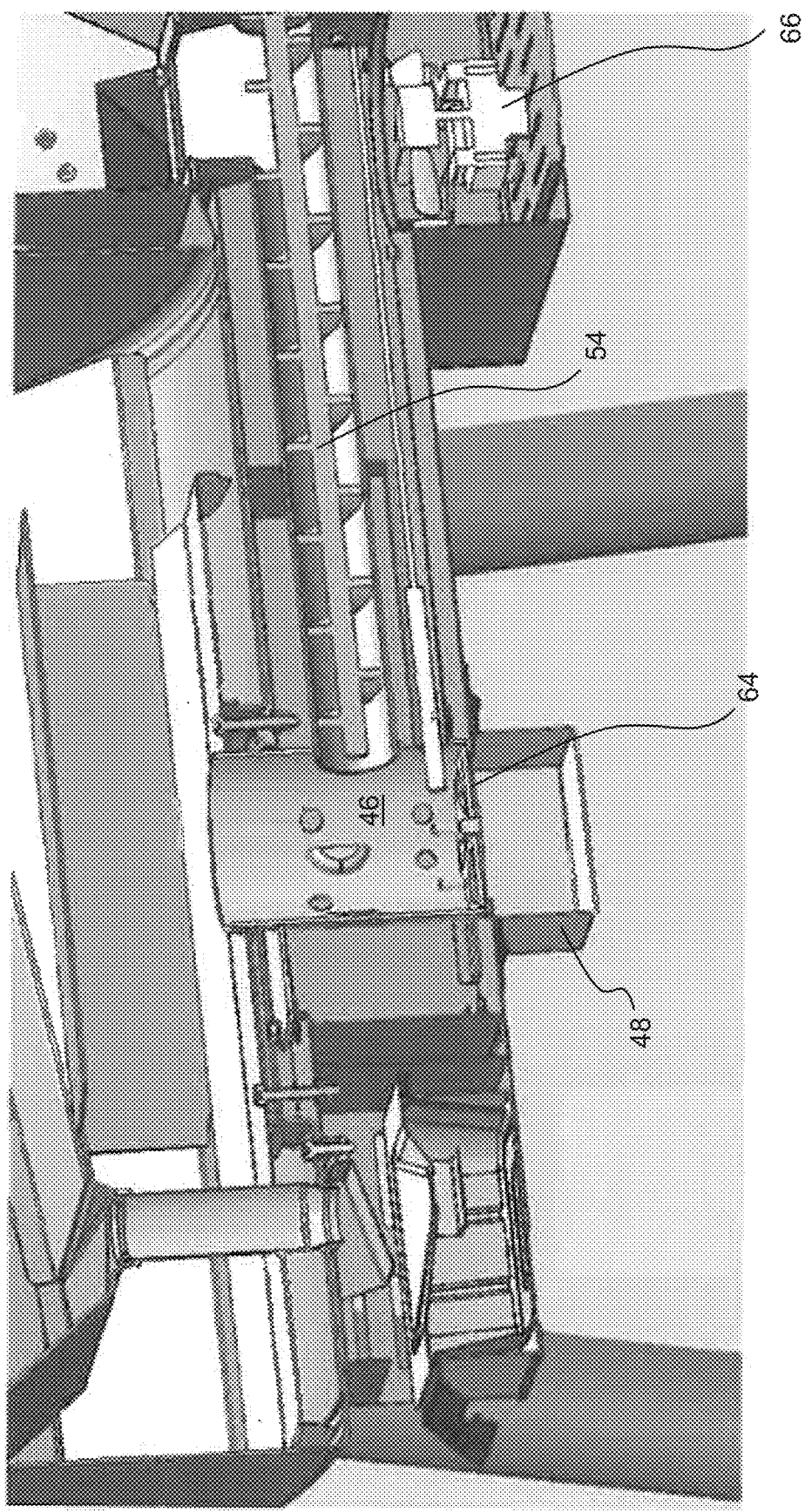
FIG. 19 is a cut-away perspective view of the fire pot, auger and air fan of the cooking apparatus of FIG. 1 according to one embodiment.

As also shown the body 12 is coupled to a pellet supply portion 14, which as shown may include a hopper 22 for storing fuel (generally in chamber 42 as shown in FIG. 8). Generally, the fuel will be in the form of combustible pellets (typically wood pellets), which may of different types of wood (hickory, mesquite, etc.) and which may have additives such as flavourings and so on. The pellet supply portion 14 may also include a control panel 24 for controlling the operation of the cooking apparatus 10 (e.g., setting temperatures, pellet feed rates and so on). For example, in some cases the cooking apparatus 10 may be used for high heat cooking (i.e., grilling) or low heat cooking (i.e., smoking) and the temperature of the cooking chamber C can be selected accordingly.

The pellet supply portion 14 may be powered by a power source, which in some embodiments may be an electrical wall panel connected via a power cord 44.

In some embodiments, the pellet supply portion 14 may include an actuator (shown schematically as 45) for effecting movement of the hopper 22 and/or chamber 42. In particular, fuel, particularly wood pellets, that are stored in the chamber 42 of the hopper 22 may tend to become stuck or clogged. For instance, some wood pellets may tend to stick to angled sides of the chamber 42, particularly in seams or other locations within the chamber 42. By using an actuator 45, the hopper 22 and/or chamber 42 can be moved to help dislodge pellets that are stuck in the chamber 42. For example, the actuator 45 could include a vibrating motor that. At particular times (such as once every few minutes), the motor could vibrate the chamber 42 to help ensure the pellets flow smoothly and tend not to stick. In some embodiments, the actuator 45 could be actuated automatically, for example by the controller based on a time-based schedule. In some embodiments, the actuator 45 may activate in response to a sensor, for example a sensor that monitors the flow of pellets. In some embodiments, the actuator 45 could be capable of manual actuation, such as by an operator or user of the cooking apparatus 10.

In some embodiments, the hopper 22 and/or chamber 42 may include one or more devices for measuring the quantity of pellets remaining in the hopper 22. For example, one or more sensors could be used to measure the quantity of pellets. In one example, an optical sensor could be used. In one example, a weight sensor could be used. In one example, the actuator 45 could be pulsed, and a measured vibration response could be used to estimate the quantity of pellets in the hopper 22.

In some embodiments, the hopper 22 and/or chamber 42 may include one or more drain holes for selectively removing the fuel therefrom. For example, a user may desire to switch the type of fuel in the hopper 22 (i.e., switching from hickory to mesquite wood pellets), or to otherwise remove old fuel. One or more drain holes can be provided that, when opened, allow the fuel to be drained out of the hopper 22.

The cooking apparatus 10 may also include one or more grates, such as a main grate G and an upper grate UG for supporting food or cookware within the cooking chamber C (see for example FIG. 8). As shown, the body 12 may have a generally cylindrical shape. In other examples, the body 12 may have other shapes.

Located below the grates G may be one or more grate plates 56, which may be angled to direct grease or other debris that is generated during use of the cooking apparatus 10 into the grease trap 50 via an outlet 58.

The cooking apparatus 10 also includes a plurality of leg members 30 for supporting the body 22. As shown, there may be four legs 30, which may be located at four corners of the body 12. The legs 30 may help elevate the cooking apparatus 10 above a support surface such as a ground surface, a deck, and so on. In some cases, one or more of the legs 30 may include wheels to allow the cooking apparatus 10 to be moved around more easily.

In some embodiments, one of more of the legs 30 may be coupled together by a lower shelf 38. The lower shelf 38 can provide for storage during use of the cooking apparatus 10, and may also help stabilize the legs 30.

Turning now to FIGS. 8 to 21, the operation of the cooking apparatus 10 will be described in reference to some specific internal components thereof. For instance, as shown in FIG. 8, the pellet supply portion 14 includes a combustion chamber 46 for burning pellets. The pellet supply portion 14 also includes a feeding mechanism for supplying pellets from the hopper 22 to the combustion chamber 46, which in this example includes an auger 54. The auger 54 is controlled by a controller (typically by selections made on the control panel 24) and which ensures that a suitable amount of pellets are provided to the combustion chamber 46 to obtain the desired operating temperatures for the cooking apparatus 10. In particular, a heating element (which may be an electric arc or other suitable heating element) in the combustion chamber. A fan 66 may also drive air into the combustion chamber 46 to encourage efficient combustion of the pellets therein, thus reducing the amount of unburned waste product.

In some embodiments, the size and shape of the auger 54 may be specially selected to ensure good pellet flow from the hopper 22 into the combustion chamber 46. For example, as shown the auger 54 in this example includes a generally elongate rod around which is wrapped a helical member, much like a screw. The angle and pitch of this helical member and the size of the rod can be specifically selected to inhibit binding of the pellets as they travel to the combustion chamber 46.

In general, the auger 54 may be driven by one or more electric motors, and may be coupled thereto by a gear 60 located in the hopper 22. As seen by inspection of FIG. 9, wood pellets in the hopper 22 can pass through an opening 62 to engage with the auger.

One or the challenges with the operation of pellet-fired cooking apparatuses generally is the generation of unburned waste product (i.e., unburned ash and other portions of the pellets). Although pellet-fired coking apparatus tend to be relatively efficient, their configuration can make this a problem. In particular, the combustion chamber 46 tends to be cylindrical and of relatively small size. This helps to ensure efficient combustion. However, the small size means that any unburned waste products tends to accumulate in the combustion chamber 46, and can quickly interfere with the operation of the cooking apparatus 10. For example, some prior art cooking apparatuses require the combustion chamber to be regularly cleaned by vacuuming it out, which often requires a substantial disassembly of all or a portion of such cooking apparatuses.

Figure 20:
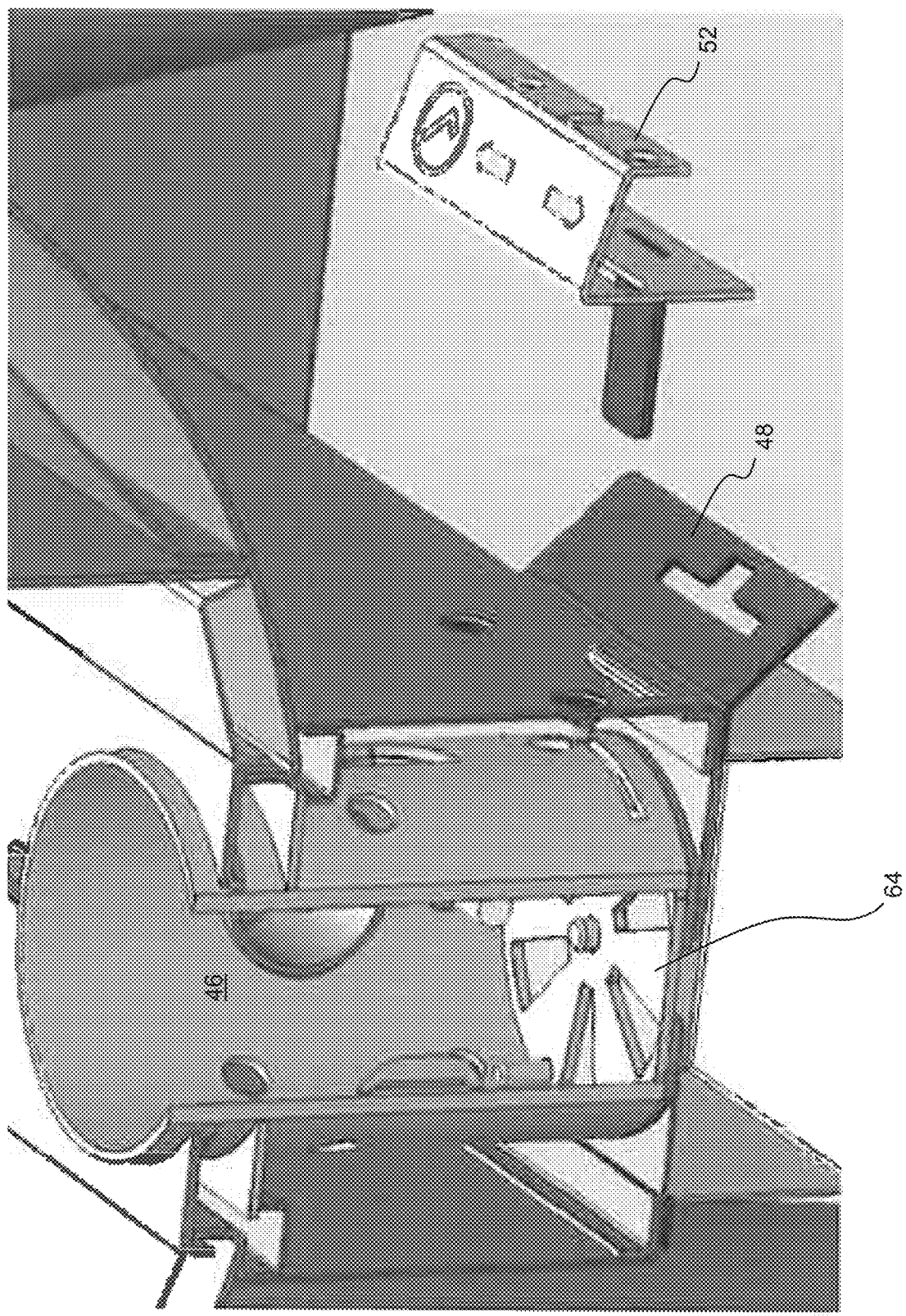
FIG. 20 is a cut-away perspective view of the fire pot of the cooking apparatus of FIG. 1 according to one embodiment showing the ash-hole agitator.
Figure 21:
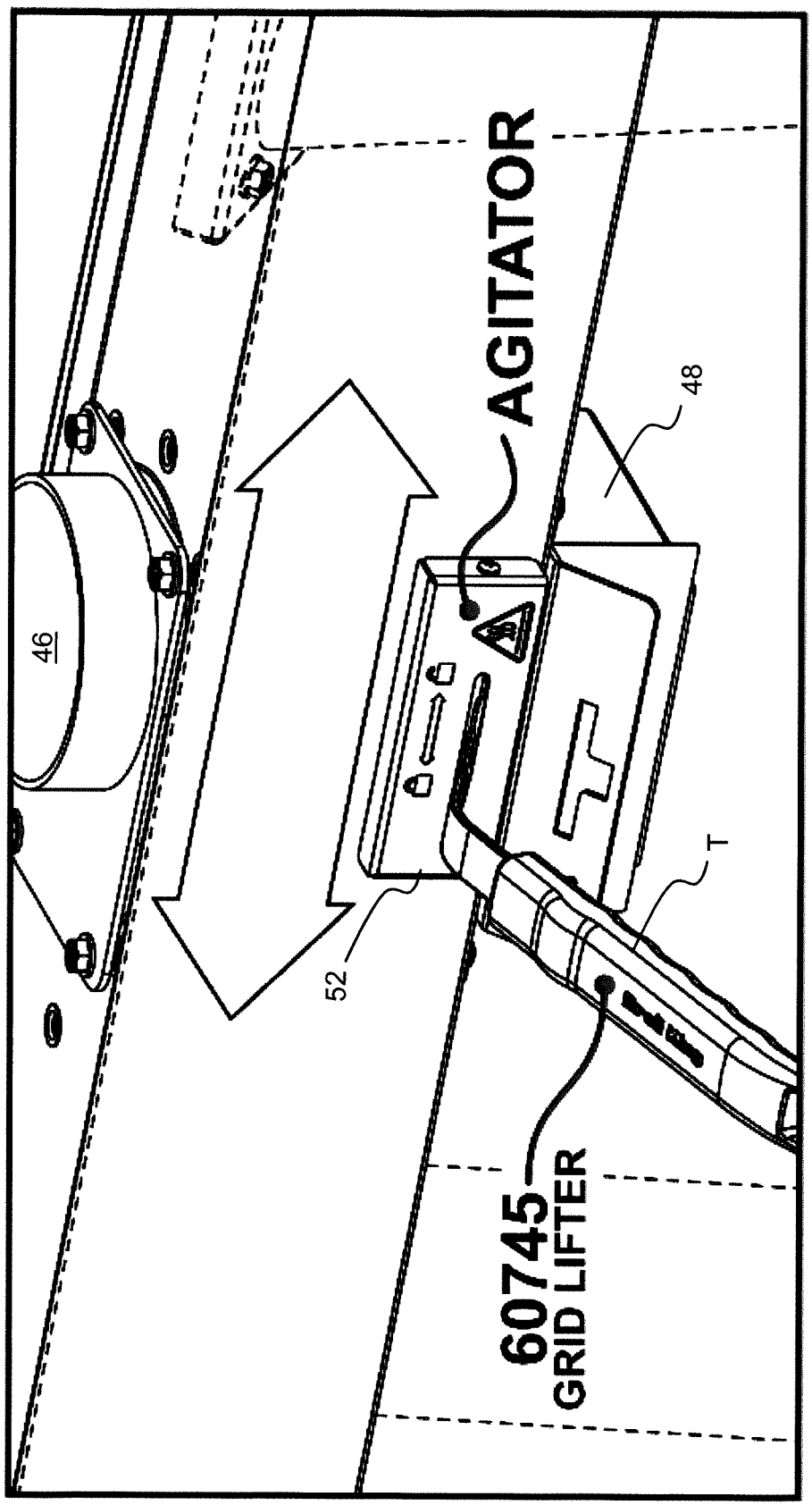
FIG. 21 is a front perspective view of the ash-hole agitator being activated by a tool, such as a grid lifter.

Located below the combustion chamber 46 according to the present teachings, however, is an as collection receptacle 48. Located generally between the receptacle 48 and the combustion chamber 46 is an ash-shaker. More specifically, the ash-shaker includes an external actuator 52 that controls one or more moving elements 64 in the bottom of the combustion chamber 46. As shown in FIG. 20 for example, the moving element 64 in this embodiment include a circular plate with several holes. These holes cooperated with holes in the bottom of the combustion chamber 46. When ash or other unburned debris builds up in the combustion chamber 46, the actuator 52 can be moved, rotating or otherwise moving the moving element 64 and allowing the unburned debris to fall out of the combustion chamber and into the receptacle 48. The receptacle 48 can then be removed and the unburned debris discarded. In this manner, the combustion chamber 46 can be cleaned out without needing to substantially dismantle the cooking apparatus 10.

In some embodiments, the moving element 64 may have other shapes, and could for instance be rectangular.

In some embodiments, the actuator 52 can be actuated by hand. In some embodiments, the actuator 52 is designed to be used with a tool T (such as a grid lifter—see FIG. 21). This can help facilitate operation of the actuator 52, particularly then the cooking apparatus 10 is hot.

Figure 23:
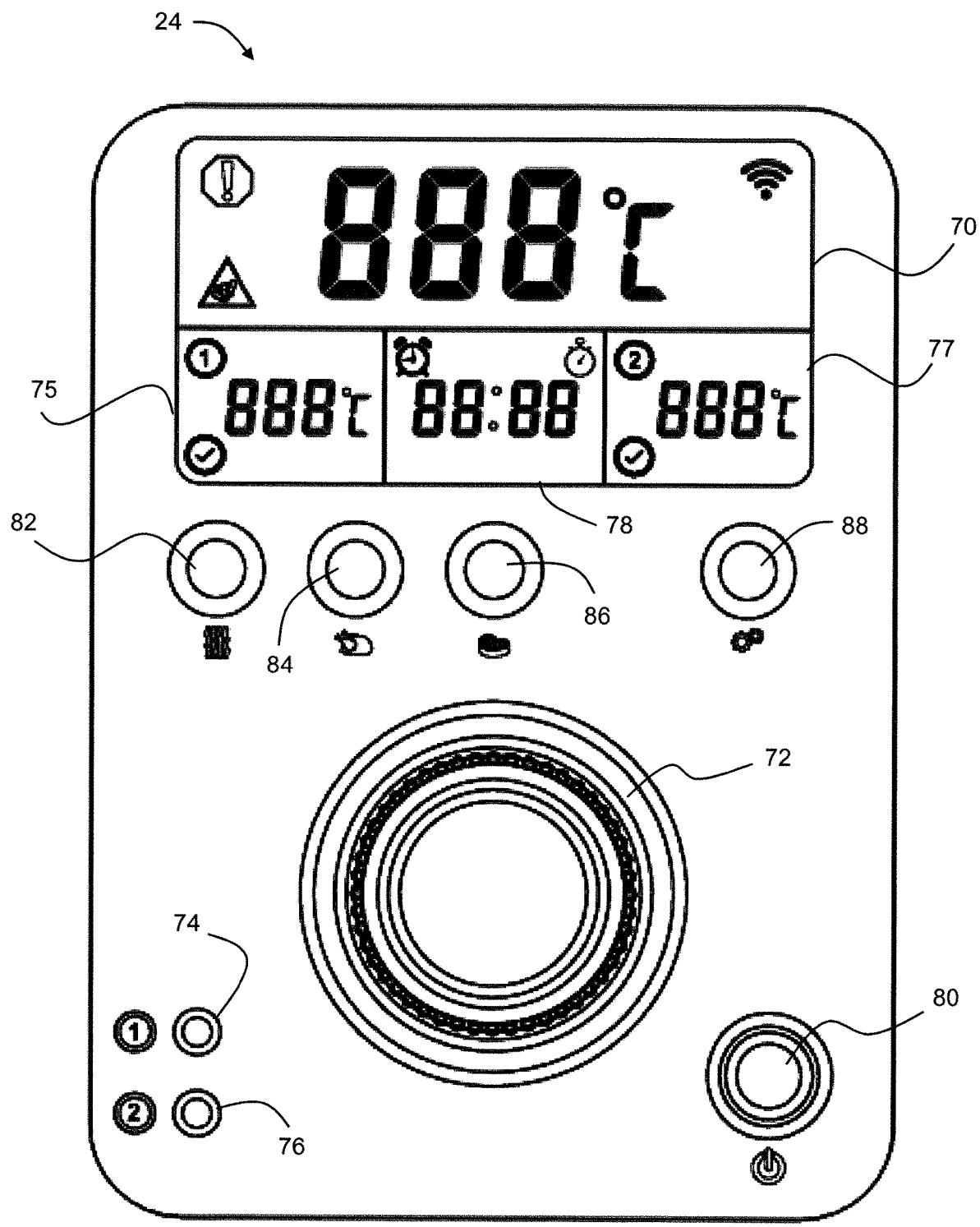
FIG. 23 is a detailed view of the control panel for the cooking apparatus of FIG. 1 according to one embodiment.

Turning now to FIG. 23, illustrated therein is a detailed view of the control panel 24 of the cooking apparatus 10.

Control panel 24 in this embodiment includes a main display 70, which can show details such as the desired or actual operating temperature of the cooking apparatus 10 (which may be measured by a probe installed in the cooking chamber C). Control panel 24 may also include a main control knob 72 for selecting the desired operating temperature.

Control panel 24 may also include probe ports 74, 76 for coupling to one or more probe thermometers (i.e., meat thermometers), which can be used to measure the temperature of food products being cooked. The measured temperatures can be displayed on secondary displays 75, 77. Another display 78 may also show time information, such as elapsed time, a timer, and so one.

The control panel 24 may also include a power button 80 for turning the cooking apparatus on and off).

The control panel 24 may also include preset temperature buttons operable to select particular cooking temperatures, such as a first button 82 for smoking food, a second button 84 for poultry, and a third button 86 for high heat grilling.

The control panel 24 may also include a settings button 88, which may allow a user to adjust one or more characteristics of the cooking apparatus 10. This could include, for instance, adjusting the auger speed, activating the rotisserie 39, and so on.

Figure 1:
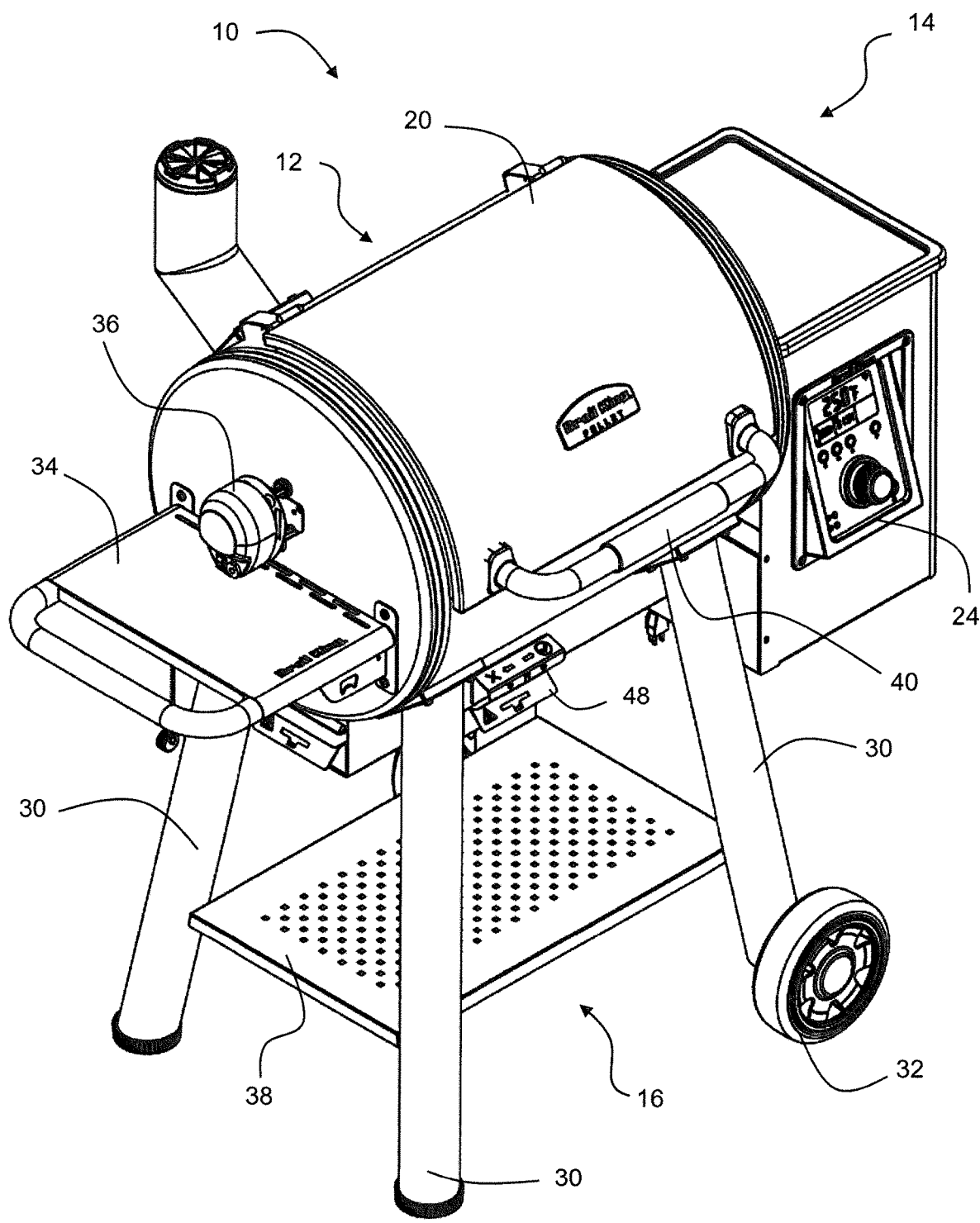
FIG. 1 is a first perspective view of a pellet fired cooking apparatus according to one embodiment.
Figure 2:
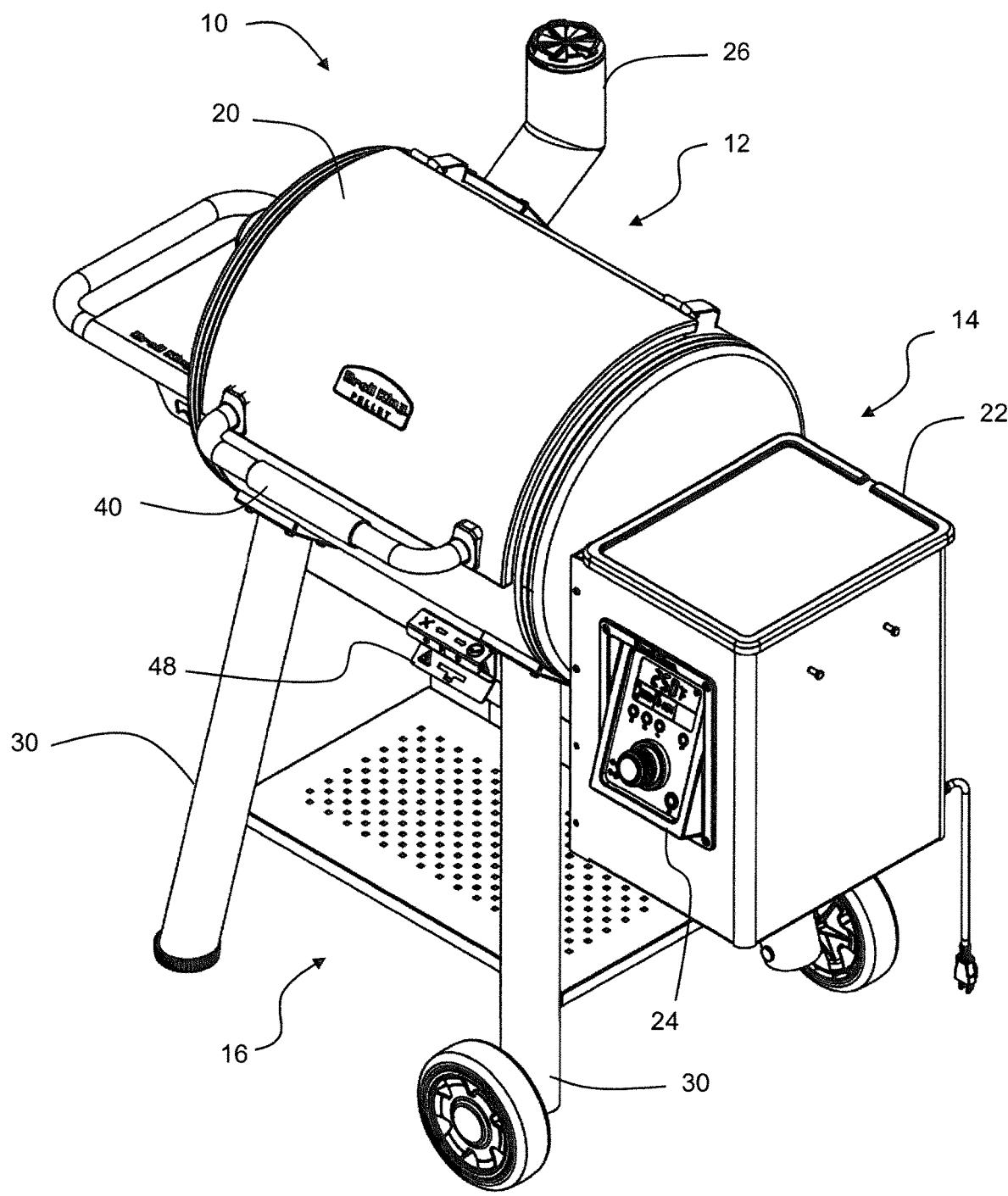
FIG. 2 is a second perspective view of the pellet fired cooking apparatus of FIG. 1.
Figure 24:
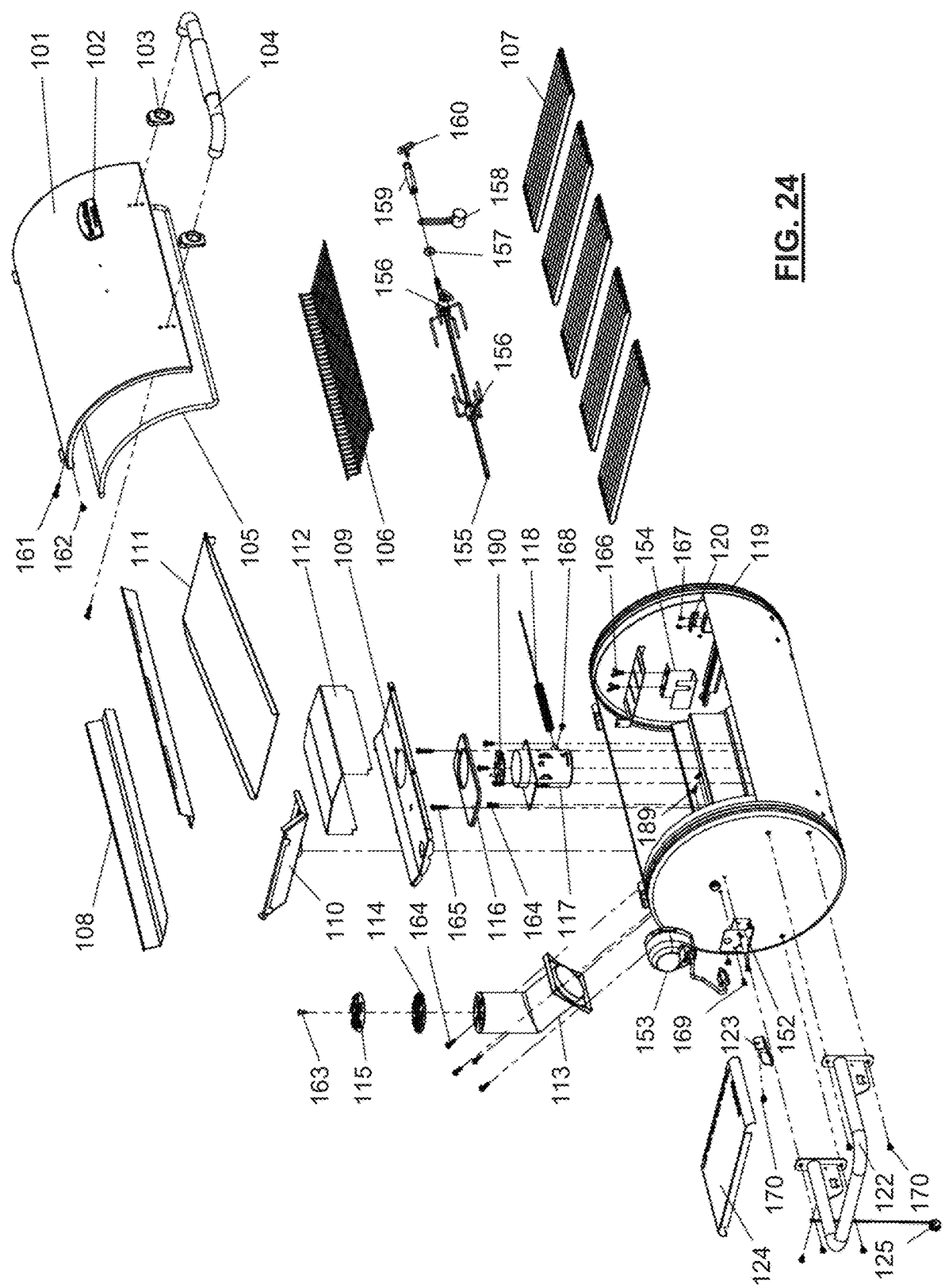
FIG. 24 is a detailed exploded view of a first portion of the cooking apparatus of FIG. 1 according to one embodiment.
Figure 25:
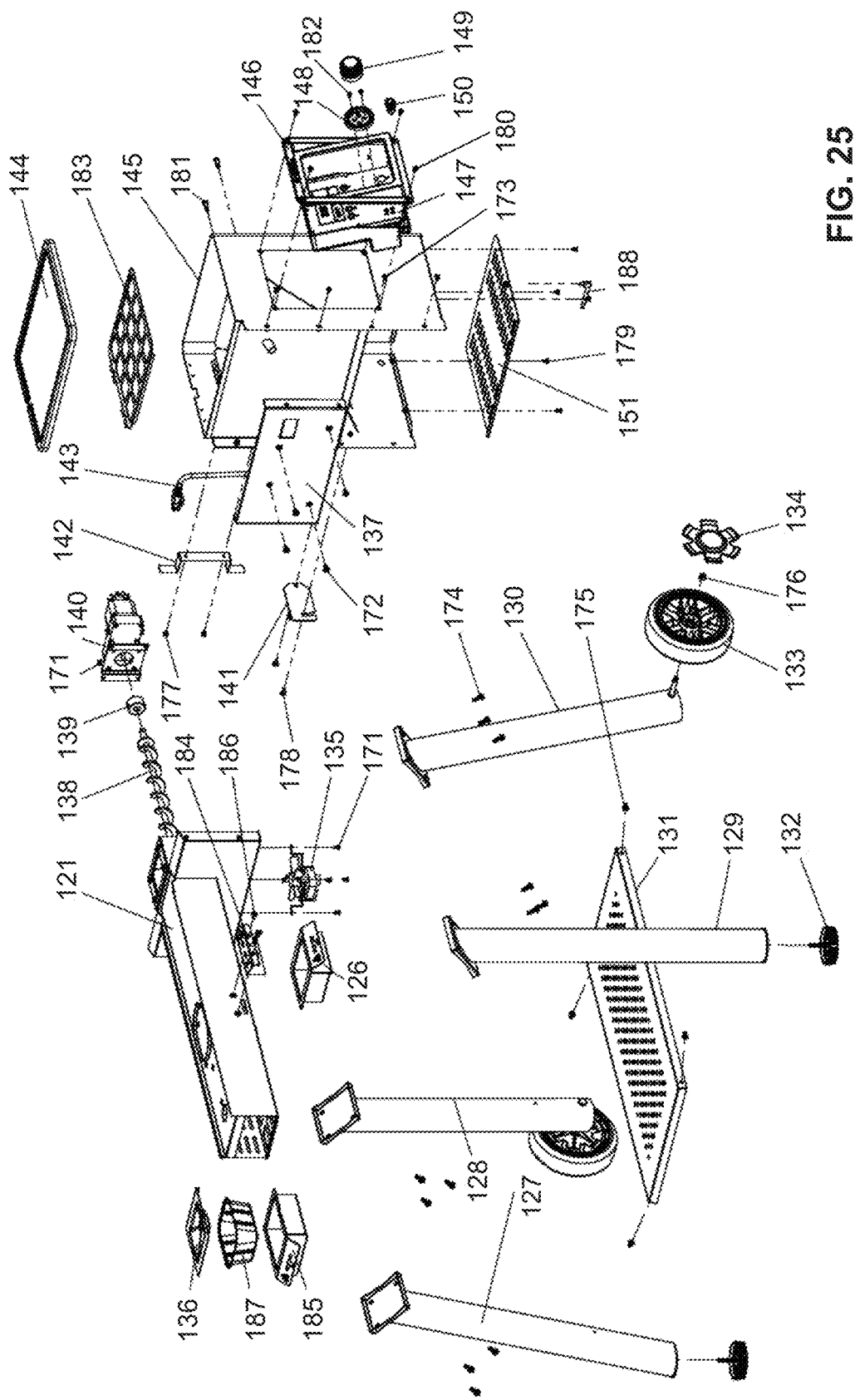
FIG. 25 is a detailed exploded view of a second portion of the cooking apparatus of FIG. 1 according to one embodiment.

Turning lastly to FIGS. 24-25, illustrated therein are detailed exploded views of the various components of the cooking apparatus of FIG. 1 according to one embodiment, while Table 1, below, details the parts referred to.

TABLE 1

| Reference Number | Description |
| --- | --- |
| \multicolumn{2}{c}{Parts of FIGS. 24 and 25.} | |
| 101 | Main Lid Weld Assembly |
| 102 | Nameplate - Pellet |
| 103 | Handle Seat |
| 104 | Lid Handle Assembly |
| 105 | Glass Fibre |
| 106 | Warming Rack |
| 107 | Cask Cooking Grid |
| 108 | Guide Plate-Grease Tray |
| 109 | Heat Deflector Assembly |
| 110 | Grease Tray Weld Assembly |

TABLE 1-continued

Parts of FIGS. 24 and 25.

| Reference Number | Description |
| --- | --- |
| 111 | Grease Tray |
| 112 | Radiant Panel |
| 113 | Chimney Weld Assembly |
| 114 | Damper Bottom |
| 115 | Damper Top |
| 116 | Burner Cover |
| 117 | Fire Pot Weld Assembly |
| 118 | Hot Rod |
| 119 | Body Weld Assembly Pellet |
| 120 | Pellet Probe |
| 121 | Pay-off Panel Weld Assembly |
| 122 | Side Handle Weld Assembly |
| 123 | Rotisserie Support |
| 124 | Side Shelf |
| 125 | Rotisserie Cap Assy |
| 126 | Ash Pan Weld Assembly |
| 127 | Leg Rear Weld Assembly-LH |
| 128 | Leg Rear Weld Assembly-RH |
| 129 | Leg Front Weld Assembly-LH |
| 130 | Let Front Weld Assembly-RH |
| 131 | Cart Base |
| 132 | Balance Foot |
| 133 | Wheel Assembly |
| 134 | Wheel Hub Cap |
| 135 | Air Fan |
| 136 | Cover - Grease Tray |
| 137 | Hopper Panel Assembly - Left |
| 138 | Pellet Auger |
| 139 | Auger Sleeve |
| 140 | Auger Motor |
| 141 | Fuel Door |
| 142 | Wire Bracket |
| 143 | Power Cord |
| 144 | Pellet Box Lid Assembly |
| 145 | Pellet Box Assembly |
| 146 | PCB Outer Cover Assembly |
| 147 | Pellet Controller |
| 148 | Knob Bezel |
| 149 | Control Knob - Small |
| 150 | Switch With LED Ring |
| 151 | Pellet Box Patch B |
| 152 | Rotisserie Bracket |
| 153 | Motor |
| 154 | Rotisserie Support |
| 155 | Spit Rod |
| 156 | Rotisserie Meat Forks |
| 157 | Counter Weight Washer |
| 158 | Rotisserie Counter Weiqht |
| 159 | Rotisserie Collar |
| 160 | Thumb Screw |
| 161 | Screw |
| 162 | Bolt |
| 163 | Vent Bolt |
| 164 | Screw |
| 165 | Screw |
| 166 | Butterfly Screw |
| 167 | Screw |
| 168 | Bolt |
| 169 | Screw |
| 170 | Bolt |
| 171 | Screw |
| 172 | Bolt |
| 173 | Screw |
| 174 | Screw |
| 175 | Bolt |
| 176 | Lock Nut M8 |
| 177 | Screw |
| 178 | Pellet Bolt |
| 179 | Screw |
| 180 | Screw |
| 181 | Carriage Bolt-Tool Hook |
| 182 | Screw |
| 183 | Pellet Mesh Assembly |
| 184 | Damper Base |
| 185 | Grease Tray Base |
| 186 | Pellet Bolt |

TABLE 1-continued

Parts of FIGS. 24 and 25.

| Reference Number | Description |
|---|---|
| 187 | Grease Tray |
| 188 | WIFI Receive Great Assembly |
| 189 | Butterfly Nut |
| 190 | SS Burner Damper Assembly |

While the above description provides examples of one or more apparatus, methods, or systems, it will be appreciated that other apparatus, methods, or systems may be within the scope of the present description as interpreted by one of skill in the art.

The invention claimed is:

1. A cooking apparatus, comprising:
   a body defining an interior cooking chamber for cooking food;
   a pellet supply portion coupled to the body and including a hopper for storing fuel;
   a combustion chamber for burning the fuel and heating the cooking chamber;
   a feeding mechanism for supplying fuel from the hopper to the combustion chamber;
   a removable collection receptacle located below the combustion chamber, wherein the combustion chamber has a plurality of holes in a bottom of the combustion chamber leading to the removable collection receptacle located below the combustion chamber; and
   an ash-shaker located between the collection receptacle and the combustion chamber, the ash-shaker including an external actuator that controls one or more moving elements located in the combustion chamber, wherein movement of the moving elements encourages unburned debris in the combustion chamber to fall into the receptacle, after which the collection receptacle can be removed and the unburned debris discarded, and
   wherein the one or more moving elements including a plate with a plurality of holes in the plate such that the external actuator can be moved to move the plate to allow the plurality of holes in the plate to cooperate with the plurality of holes in the bottom of the combustion chamber such that the unburned debris falls out of the combustion chamber and into the collection receptacle, and
   wherein the plate is a circular plate, and the external actuator is movable to rotate the plate to allow the plurality of holes in the plate to cooperate with the plurality of holes in the bottom of the combustion chamber such that the unburned debris falls out of the combustion chamber and into the collection receptacle; and
   wherein at least one of the combustion chamber and hopper have drain holes for selectively removing the fuel therefrom.

2. The cooking apparatus of claim 1, wherein the actuator is sized and shaped to be moved by hand.

3. The cooking apparatus of claim 1, wherein the actuator is sized and shaped to be moved using a tool.

4. The cooking apparatus of claim 1, further comprising a control panel for controlling the cooking apparatus.

5. The cooking apparatus of claim 1, wherein the fuel includes combustible pellets.

6. The cooking apparatus of claim 1, wherein the fuel includes wood pellets.

7. The cooking apparatus of claim 1, wherein the feeding mechanism is controlled by a controller to ensure that a suitable amount of fuel is provided to the combustion chamber to obtain desired operating temperatures for the cooking apparatus.

8. The cooking apparatus of claim 1 wherein the pellet supply portion is powered by an electrical power source.

9. The cooking apparatus of claim 1 wherein the feeding mechanism comprises an auger.

10. The cooking apparatus of claim 1, further comprising a heating element in the combustion chamber for burning the fuel.

11. The cooking apparatus of claim 1, further comprising a fan that drives air into the combustion chamber to encourage efficient combustion of the fuel.

12. The cooking apparatus of claim 1, further comprising an actuator for effecting movement of the hopper.

13. The cooking apparatus of claim 12, wherein the actuator includes a vibrating motor.

14. The cooking apparatus of claim 13, wherein the vibrating motor is selectively activated to discourage fuel from sticking in the hopper.

15. The cooking apparatus of claim 1, further comprising a sensor for measuring a quantity of fuel in the hopper.

* * * * *